No. 662,959. Patented Dec. 4, 1900.
S. PARKS.
TAIL CONTROLLER.
(Application filed Apr. 16, 1900.)

(No Model.)

Witnesses:
Albert C. Tanner.
Frank Burke

Inventor:
Samuel Parks

UNITED STATES PATENT OFFICE.

SAMUEL PARKS, OF NEW YORK, N. Y.

TAIL-CONTROLLER.

SPECIFICATION forming part of Letters Patent No. 662,959, dated December 4, 1900.

Application filed April 16, 1900. Serial No. 13,111. (No model.)

*To all whom it may concern:*

Be it known that I, SAMUEL PARKS, a subject of the Queen of Great Britain, residing at No. 132 West Fifty-fifth street, in the city of New York, borough of Manhattan, in the county and State of New York, have invented certain new and useful Improvements in Tail-Controllers, which improvements are fully set forth in the following specification and accompanying drawings.

Figure 1:
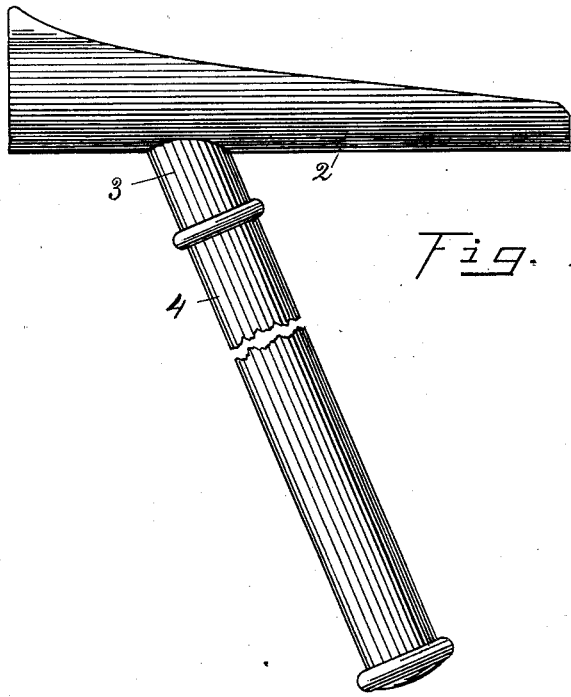
Figure 2:
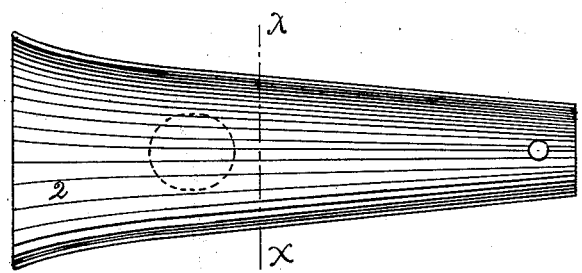
Figure 3:
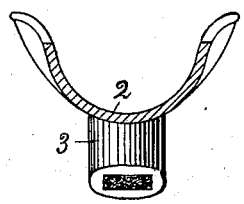

In the drawings, Figure 1 is a side elevation view of a tail-controller constructed in accordance with my invention. Fig. 2 is a plan view of said tail-controller. Fig. 3 is a transverse section on the line $x$ $x$ of Fig. 2.

Similar reference-numerals denote like parts throughout the several views of the drawings.

This invention relates to improvements in devices of that class which may be designated as "tail-controllers," the same being utilized for the purpose of controlling the tail of a horse or like animal during the process of trimming, as in the ordinary manner, the tail-hairs of such animal.

The object of this invention is to provide a device of the type above indicated which shall be simple, novel, and cheap as regards construction and effective in the accomplishment of the purpose for which it is designed.

The invention consists in the employment of certain novelly-formed parts, in the novel relative arrangement of the component parts, and in certain details of construction, all of which will be specifically referred to hereinafter.

Having reference to the accompanying drawings, 2 denotes an elongated body portion, 3 a handle-socket, and 4 a handle detachably engaging said socket.

The body portion 2 and socket 3 may be formed, as by stamping, from suitable material, as sheet-iron or sheet-steel. In such case said socket and said body portion may be formed separate and the socket thereafter secured to the body portion in any approved manner; but where it is deemed advisable to produce the body portion by the process known as "casting" the socket 3 is formed integral with the body portion by preference.

The body portion 2 is designed to receive and control the tail (ordinarily docked) of a horse or like animal, and to this end it is essential that the body portion 2 be so shaped as to render it capable of checking or preventing lateral displacement of the horse's tail with respect to said body portion. Therefore I provide said body portion with a longitudinal channel, substantially as illustrated in the drawings, which channel extends from the front to the rear end of said body portion. Again, that the body portion 2 may be thus provided with a longitudinal channel I prefer to give said body portion a semitubular form, substantially as indicated in Fig. 3 of the drawings, and I further deem it advisable to taper the body portion 2 from the front end to the rear end thereof, substantially as indicated in Fig. 2 of the drawings, to the end that said body portion may correspond in shape with the shape of the tail of a horse or like animal.

The handle 4 has a suitably-formed reduced end adapted to enter the socket 3 under force, or said reduced end of the handle 4 may be threaded to engage suitable threads with which the socket 3 may be provided.

The socket 3 is here shown as arranged at a rearward inclination to the plane of the body portion 2, to the end that the handle 4 when in position for service may stand at a rearward inclination to the plane of said body portion.

In operation the user of my improved tail-controller grasps the handle 4 and urges the front end of the controller firmly against the animal's crupper, the animal's tail occupying the channel of the body portion 2 and the tail-hairs hanging over the respective sides of said body portion. Under these conditions the tail-hairs may be readily and uniformly trimmed.

It will be seen that my improved device is well adapted for the purpose for which it is designed and that the same may be modified somewhat without material departure from the spirit and principle of my invention.

Having fully described my invention, what I claim, and desire to secure by Letters Patent, is—

1. A tail-controller, comprising an elongated, tapered body portion having a longitudinal, tapered channel, and a handle carried by said body portion, as herein specified.

2. A tail-controller, comprising an elongated body portion having a longitudinal channel, and a handle carried by, and inclined rearwardly to the plane of, said body portion, as herein specified.

3. A tail-controller, comprising an elongated body portion, semitubular in cross-section, and tapered from the front end to the rear end thereof, and a handle carried by, and inclined rearwardly to the plane of, said body portion, as herein specified.

SAMUEL PARKS.

Witnesses:
W. H. RUBY,
ALBERT C. TANNER.